United States Patent [19]

Bertolli

[11] Patent Number: 4,620,778

[45] Date of Patent: Nov. 4, 1986

[54] FRAME FOR GLASSES WHICH PERMITS THE MOUNTING OF ACCESSORY ELEMENTS

[75] Inventor: Lino Bertolli, Schio, Italy

[73] Assignee: Ellebi s.a.s. Di Lino Bertolli Friglio & C, Vicenza, Italy

[21] Appl. No.: 714,280

[22] Filed: Mar. 21, 1985

[30] Foreign Application Priority Data

Jul. 25, 1984 [IT] Italy ............................. 64368/84[U]

[51] Int. Cl.⁴ ............................................. G02C 11/02
[52] U.S. Cl. ........................................ 351/51; 351/52; 351/158
[58] Field of Search ............... 351/103, 105, 110, 154, 351/158, 51, 52, 88, 137, 138, 47, 57

[56] References Cited

U.S. PATENT DOCUMENTS 2,633,059  3/1953  Lindblom ............................. 351/52

FOREIGN PATENT DOCUMENTS 251344  5/1963  Australia ................................ 351/52

Primary Examiner—Rodney B. Bovernick
Assistant Examiner—P. Dzierzynski
Attorney, Agent, or Firm—Bucknam and Archer

[57] ABSTRACT

The frame has in the front portion a hooking unit for mounting an accessory structure. The hooking unit comprises a supporting element (6) fixedly connected to the frame, a rod (5) which is sunk in the central portion of the supporting element. The supporting element (6) has at its end two orifices, and the accessory structure has a pair of pins. The pins enter within said orifices when the accessory structure is mounted onto the frame. The rod has terminal portions, and the pins (2) have grooves, the terminal portions of the rod entering the external portion of the orifices and being seated in the groove, thus holding the pins of the accessory structure firmly within the orifices.

1 Claim, 6 Drawing Figures

U.S. Patent  Nov. 4, 1986  4,620,778
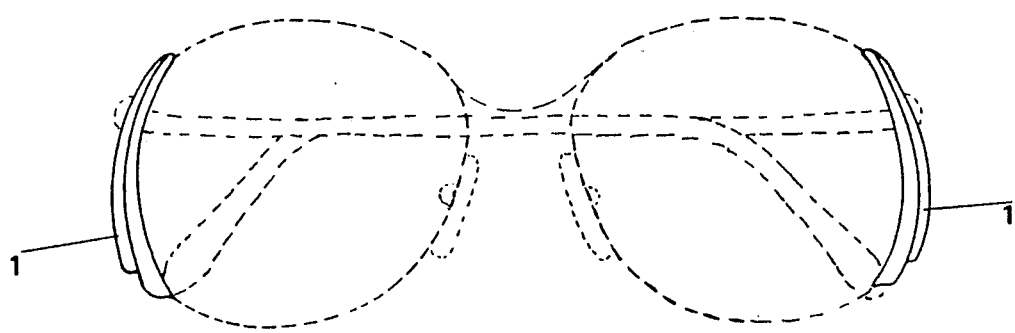
FIG. 1
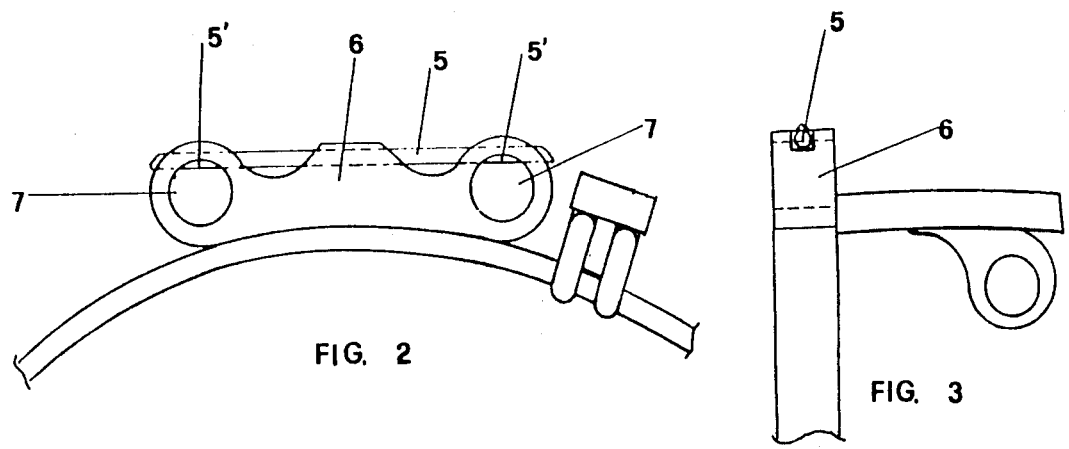
FIG. 2
FIG. 3
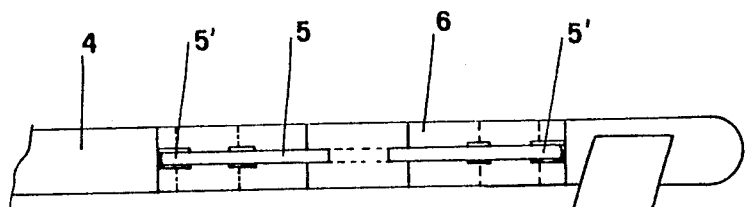
FIG. 4
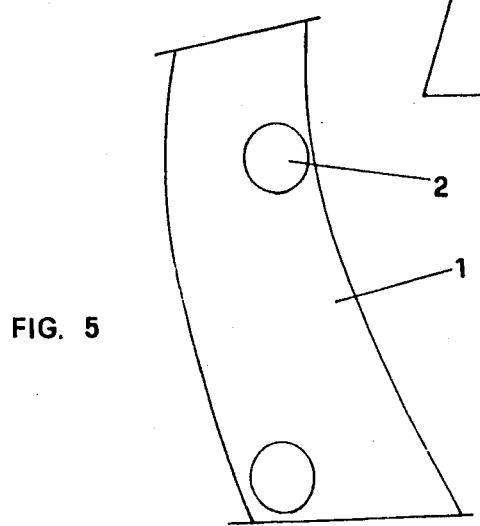
FIG. 5
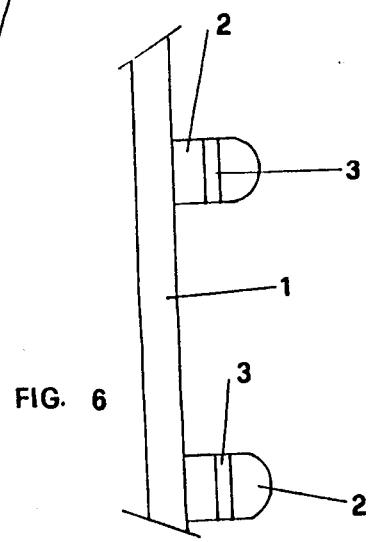
FIG. 6

FRAME FOR GLASSES WHICH PERMITS THE MOUNTING OF ACCESSORY ELEMENTS

The present invention relates to frames for glasses and more specifically, to a frame for glasses which permits the user to mount very simply accessory structures and interchange accessory structures which serve for ornamental purposes.

In actual practice, with the frame according to the present invention, the user may carry out with great simplicity, the mounting of different structures which characterize the esthetic appearance of the frame. The user also may replace with great simplicity, structures previously mounted onto the frame and substitute other structures according to different requirements.

The invention is further illustrated by reference to the accompanying drawings of which:

FIG. 1 is a front view of the frame;

FIGS. 2, 3 and 4 are three cross sections of the portion of the frame which permits the mounting of the accessory element used for ornamental purposes;

FIGS. 5 and 6 are a rear view and a side view respectively of one of the accessory structures to be mounted onto the frame.

FIG. 1 shows the frame of the present invention which is provided on both sides with element 1 which is the accessory element and which may have a variety of shapes and colors. FIGS. 5 and 6 illustrate the accessory structure, the rear surface of which is provided with a pair of pins 2. Each pin is provided with a groove 3 on the part which much be turned towards the interior part of the frame.

The front part of the frame 4 in the side portions, is provided with means for hooking each one of the elements 1. The latter consists of a small rod 5 fixed at a certain distance from the frame by means of support 6. The latter has an elongated shape and presents approximately the same thickness as the frame. The rod 5 is sunk within the central portion of the support. The support 6 is provided at its ends with two orifices 7 within which the pins 2 are inserted. The pins are held in place by the rod 5 which corresponding to its ends 5' enters partially within the orifices 7. The pins 2 are blocked and the entire structure 1 is held in place due to the presence of the grooves 3 within which the terminal ends 5' of the rod 5 seat corresponding to the portion which is turned towards the interior.

The frame according to the present invention permits to fix solidly the decorative structure 1 to the frame and at the same time, permits the possibility of dismounting the accessory structure by using a very small force so that it is possible to interchange the decorative elements and to vary the esthetic appearance of the frame.

The hooking means of the decorative element 1 may be arranged in any position of the frame and the decorative structures may have any shape and any size so as to vary the esthetic appearance of the frame. The decorative elements may also be provided with an enamel appearance or may be decorated in different colors or with rhinestones or precious stones.

What is claimed is:

1. A frame for glasses and an accessory structure, wherein the frame has in the front portion a hooking means for mounting said accessory structure, said hooking means comprising a supporting element which is fixedly connected to said frame, a rod which is sunk in the central portion of said supporting element, said supporting element having at its ends two orifices, said accessory structure having a pair of pins, said pins entering within said orifices when the accessory structure is mounted onto the frame, said rod having terminal portions, said pins having grooves, the terminal portions of said rod entering the external portion of said orifices and being seated in said grooves, thus holding the pins of the accessory structure firmly within said orifices.

* * * * *